Patented July 7, 1942

2,289,277

UNITED STATES PATENT OFFICE 2,289,277

PROCESS OF RECOVERING PHOSPHORUS FROM PHOSPHORUS SLUDGES

Friedbert Ritter and Franz Rodis, Piesteritz, Germany

No Drawing. Application April 18, 1939, Serial No. 268,638. In Germany April 29, 1938

6 Claims. (Cl. 23—223)

This invention relates to a process of recovering phosphorus from phosphorus sludges such as are obtained in the reduction of phosphates.

In the thermal reduction of phosphate rock by means of carbon in an electric furnace or a shaft furnace, the phosphorus vapours liberated are generally condensed to form yellow phosphorus by treating the gases with water, preferably after removing the dust therefrom at a temperature above the dew point of phosphorus. The condensing action of the water can be considerably enhanced by mechanical means such as intensive mixing devices or centrifugal washers. However, the impurities contained in the vapours which may be either substances of a volatile nature such as silicon tetrafluoride, or solids, such as dust, cause a certain proportion of the yellow phosphorus to condense in the form of an aqueous emulsion floating on the molten yellow phosphorus, which emulsion is stabilised by the presence of the aforesaid impurities and constitutes a very thick sludge from which it is impossible to recover the yellow phosphorus in a pure form even by the application of temperatures of about 60 to 80° C.

A similar formation of sludge is observed in the course of time, when yellow phosphorus which has been condensed from phosphorus furnace gases by dry processes, for instance in electrical precipitators, is stored under a layer of water.

The present invention provides a process of working up phosphorus sludges of the foregoing kind, for the purpose of recovering pure yellow phosphorus therefrom.

According to the invention, the water contained in such sludges is eliminated, therefrom by heating said sludges in a closed vessel, under a pressure below atmospheric, so as to cause evaporation of water until all the water has distilled off.

This treatment breaks the emulsion of phosphorus in water and causes the yellow phosphorus to assume the form of a mobile melt from which the solid impurities can be eliminated in any desired manner, for instance by filtering.

The reduced pressure may be applied in a single stage or in several stages; the application of several stages is preferable especially if difficulties are encountered in removing the last traces of water.

In such cases, the sludge is first heated in a first vessel under a moderately reduced pressure, until it has become sufficiently mobile to be pumped into a second vessel where the balance of the water is removed under a more reduced pressure.

The process of the present invention is preferably carried out directly in the scrubber in which the phosphorus is condensed by means of water, by making the scrubber pressure resistant and providing it with a vacuum connection. When the scrubber is full, the underlying layer of molten yellow phosphorus is first tapped off, the supernatant water above the phosphorus sludge is then pumped off, and finally the scrubber is externally heated at the desired temperature while connecting it to a vacuum pump.

In practical operation the vacuum applied is preferably made somewhat dependent on the temperature of the sludge to be treated, or vice versa, in the sense that the temperature of the sludge is maintained only moderately above the boiling point of water at the prevailing pressure. If the temperature of the sludge be raised too far above this point then, particularly when employing comparatively small vessels, the sludge is apt to form a very voluminous foam which may be sucked into the pipe connecting with the vacuum pump, which of course is undesirable. When using a strong vacuum pump, the pressure prevailing in the initial stages of operation inside the vessel is quite substantial (e. g. of the order of 300–400 mms. mercury abs.) owing to the more plentiful evaporation of water; but in the course of operation that pressure decreases, and when practically all the water is removed from the sludge, it will only be of the order of 20 mms. mercury abs. These circumstances will preferably be taken into consideration in adjusting the temperature of the sludge from time to time, although the danger of foam formation becomes progressively smaller as the sludge loses water and therefore, in the later stages of operation, it is without risk to allow the temperature of the sludge to remain well above the boiling temperature of water at the then prevailing (low) pressure.

The time required for the treatment according to the invention varies considerably with the quality of the sludge and also with the size of the batch to be treated. By way of example, the treatment of 35 tons of sludge containing about 35% of water, required to be carried on for 120 hours until all the water was removed.

When working in accordance with the present invention practically all the phosphorus is thus recovered in a liquid form. Only a very small amount of phosphorus distills off from the sludge during the heat treatment and this may be easily recovered, in the liquid state, by cooling the vapours drawn off from the scrubber to a temperature slightly above the melting point of phosphorus.

We claim:

1. A process of recovering yellow phosphorus from phosphorus sludge containing water wherein the phosphorus is present partly in the form of an aqueous emulsion which comprises heating such sludge in a closed vessel under a pressure below atmospheric so as to cause evaporation of water, until all the water has evaporated, no phosphorous being distilled from the vessel during the evaporation of the water.

2. A process of recovering yellow phosphorus from phosphorus sludge containing water wherein the phosphorus is present partly in the form of an aqueous emulsion which comprises heating such sludge in a closed vessel under progressively decreasing pressure so as to cause evaporation of water, until all the water has evaporated, no phosphorus being distilled from the vessel during the evaporation of the water.

3. A process of recovering yellow phosphorus from phosphorus sludge containing water wherein the phosphorus is present partly in the form of an aqueous emulsion which comprises heating such sludge in a closed vessel under progressively decreasing pressure so as to cause evaporation of water, the decrease of pressure being effected in stages, until all the water has evaporated, no phosphorus being distilled from the vessel during the evaporation of the water.

4. A process of recovering yellow phosphorus from phosphorus sludge containing water wherein the phosphorus is present partly in the form of an aqueous emulsion, which comprises heating such sludge in a closed vessel under a pressure below atmospheric so as to cause part of the water to evaporate, thereafter transferring such sludge to a second closed vessel and heating such sludge therein at a pressure yet further below atmospheric so as to cause further quantities of the remaining water to evaporate, until all the water has evaporated, no phosphorus being distilled from the vessel during the evaporation of the water.

5. The process of recovering yellow phosphorus from phosphorus sludges such as are obtained by the condensation of phosphorus vapors, liberated in the thermal reduction of phosphate rock by means of carbon, in water, which sludge contains the phosphorus in the form of an aqueous emulsion, which process comprises heating such sludge in a closed vessel under a pressure below atmospheric so as to cause evaporation of water, until all of the water has been evaporated, no phosphorus being distilled from the vessel during the evaporation of the water.

6. The process of recovering yellow phosphorus from phosphorus sludges such as are obtained by the condensation of phosphorus vapors, liberated in the thermal reduction of phosphate rock by means of carbon, in water, which sludge contains the phosphorus in the form of an aqueous emulsion, which process comprises heating such sludge in a closed vessel under progressively diminishing pressure below atmospheric so as to cause evaporation of water, until all of the water has been evaporated, no phosphorus being distilled from the vessel during the evaporation of the water.

FRIEDBERT RITTER.
FRANZ RODIS.